(12) United States Patent
Ueda et al.

(10) Patent No.: US 7,131,018 B2
(45) Date of Patent: Oct. 31, 2006

(54) ELECTRONIC APPARATUS AND POWER SUPPLYING METHOD

(75) Inventors: Tomohiro Ueda, Tokyo (JP); Hiroyuki Kiba, Tokyo (JP); Satoshi Akui, Kanagawa (JP)

(73) Assignee: Sony Corporation (JP)

( * ) Notice: Subject to any disclaimer, the term of this patent is extended or adjusted under 35 U.S.C. 154(b) by 409 days.

(21) Appl. No.: 10/678,100

(22) Filed: Oct. 6, 2003

(65) Prior Publication Data

US 2004/0076062 A1    Apr. 22, 2004

(30) Foreign Application Priority Data

Oct. 16, 2002  (JP)  ............ P2002-301813

(51) Int. Cl.
G06F 1/26    (2006.01)
(52) U.S. Cl. ............ 713/324; 713/300; 713/320
(58) Field of Classification Search ............ 713/300, 713/320, 323, 324, 330
See application file for complete search history.

(56) References Cited

U.S. PATENT DOCUMENTS

| | | | | |
|---|---|---|---|---|
| 4,593,383 A * | 6/1986 | Armstrong et al. | ......... | 365/203 |
| 5,241,680 A * | 8/1993 | Cole et al. | ......... | 713/322 |
| 5,542,035 A * | 7/1996 | Kikinis et al. | ......... | 713/323 |
| 5,696,953 A * | 12/1997 | Wong et al. | ......... | 713/601 |
| 5,842,028 A * | 11/1998 | Vajapey | ......... | 713/310 |
| 5,878,264 A * | 3/1999 | Ebrahim | ......... | 713/323 |
| 6,490,715 B1 * | 12/2002 | Moriwaki et al. | ......... | 716/17 |
| 6,664,148 B1 * | 12/2003 | Goto et al. | ......... | 438/151 |
| 2002/0083349 A1 * | 6/2002 | Khatri et al. | ......... | 713/300 |
| 2002/0105041 A1 * | 8/2002 | Goto et al. | ......... | 257/410 |
| 2002/0126824 A1 * | 9/2002 | Lin et al. | ......... | 379/229 |
| 2002/0135398 A1 * | 9/2002 | Choi et al. | ......... | 326/93 |
| 2003/0133337 A1 * | 7/2003 | Yamada et al. | ......... | 365/200 |
| 2005/0094036 A1 * | 5/2005 | Tichelaar | ......... | 348/730 |

FOREIGN PATENT DOCUMENTS

| | | |
|---|---|---|
| JP | 2002-170933 | 6/2002 |
| JP | 2004-140503 | 5/2004 |

* cited by examiner

*Primary Examiner*—Thomas Lee
*Assistant Examiner*—Malcolm Cribbs
(74) *Attorney, Agent, or Firm*—Rader, Fishman & Grauer; Ronald P. Kananen

(57) ABSTRACT

A system LSI contains a main circuit and an eDRAM. The main circuit contains a standby controlling circuit and a CPU. Each circuit block receives power through independent power lines. Power is always supplied to the standby controlling circuit. When the system LSI has entered a standby state, power to the main circuit is turned off. Only when the eDRAM is used, power is supplied thereto. The standby controlling circuit and a power controlling circuit control power supplied to each circuit block. When there is no task the CPU has to process, the system LSI enters the standby state from the operation state. When an operation input has taken place with an operating portion or when an input has taken place in an external input, the standby controlling circuit performs a process necessary for waking up the system LSI. Power is supplied to the main circuit.

2 Claims, 8 Drawing Sheets

POWER OFF AREA    POWER ON AREA

ELECTRONIC APPARATUS AND POWER SUPPLYING METHOD

BACKGROUND OF THE INVENTION

1. Field of the Invention

The present invention relates to an electronic apparatus driven by, for example, a battery power and to a power supplying method, in particular, to a structure and a method that allow a power consumption to be reduced.

2. Description of the Related Art

Portable apparatuses such as a cellular phone, a PDA (Personal Digital Assistance), and a portable computer normally use a battery as a power supply. A battery drive type system is composed of, for example, a system LSI (Large Scale Integrated Circuit), a battery, a power control IC (Integrated Circuit), and so forth. A system LSI is an LSI of which a CPU, a memory, and various peripheral functional blocks are integrated into one chip. In recent years, a portable apparatus has not only a communication function as a cellular phone function, but also a multimedia communication function, a processing function, and so forth. To accomplish such portable apparatuses, system LSIs have been finely structured, for example, on the order of 0.3 μm or less.

Since the standby time of a battery drive type portable electronic device such as a cellular phone depends on the power consumption thereof, it is important to reduce it. For example, as a related art reference, Japanese Patent Laid-Open Publication No. 2002-170933 discloses a method for reducing a power consumption in such a manner that while the power of a system LSI is always turned on, the supply of a clock is stopped and the system LSI is placed in a standby state so as to reduce the power consumption.

In the method disclosed in the related art reference, since the power of the system LSI is always turned on, a sub threshold leak current flows in transistors of a system LSI (for example, a MOS LSI), when the LSI is in the standby state, the power consumption thereof adversely increases. A sub threshold leak current is a current that flows from a high power supply voltage to a low power supply voltage even if a MOS transistor does not operate.

As a countermeasure for decreasing a sub threshold leak current in an MOS LSI, threshold voltages of transistors are raised. The threshold voltages can be raised by performing process tuning or supplying a substrate potential. However, when a device is normally operated, if threshold voltages of transistors are raised, the speed of the device lowers. Thus, such a method is not suitable for applications that operate at high speed.

As another method for suppressing a sub threshold leak current, a power supply voltage could be lowered. Likewise, from a view point of high speed operation, this method is not suitable. In addition, it is impossible to perfectly shut off a current. Thus, the operation speed and the power consumption, which are typical indexes that represent the performance of an LSI, are always reciprocal factors. Thus, it is very difficult to improve the performances of both the factors at the same time.

As another method, a power control IC and a system LSI might be separately structured. In this case, the power control IC generates a power and a power on/off control signal. The power control IC supplies the power and the power on/off control signal to the system LSI so that when the system LSI is in the standby state, the power is turned off. In such a structure, the power consumption might be reduced in the standby state. Normally, a power control IC is composed of an analog IC circuit such as a regulator. Thus, when a complicated digital circuit that generates a control signal is built in a power control IC, since it is necessary to newly design a power control IC, the designing work thereof will be required. As a result, the cost of the power control IC will rise.

OBJECTS AND SUMMARY OF THE INVENTION

Therefore, an object of the present invention is to provide an electronic apparatus and a power supplying method that prevent a sub threshold leak current from flowing and suppress a power consumption in a standby state of the electronic apparatus without need to cause a digital circuit that turns off power of an LSI in the standby state to be built in a power control IC.

To solve the foregoing problem, a first aspect of the present invention is an electronic apparatus having a semiconductor integrated circuit and power supplying means, a first circuit and a second circuit being built in the semiconductor integrated circuit, each of the first circuit and the second circuit having a normal mode and a standby mode, the power supplying means being configured to supply power to the semiconductor integrated circuit, the electronic apparatus comprising:

mode controlling means, built in the first circuit, for changing an operation mode of the semiconductor integrated circuit to the normal mode or the standby mode; and power supply controlling means for supplying power generated by the power supplying means to the first circuit and the second circuit when the mode controlling means has changed the operation mode of the semiconductor integrated circuit to the normal mode, and for supplying power generated by the power supplying means to only the first circuit rather than the second circuit when the mode controlling means has changed the operation mode of the semiconductor integrated circuit to the standby mode.

A second aspect of the present invention is a power supplying method of an electronic apparatus having a semiconductor integrated circuit and power supplying means, a first circuit and a second circuit being built in the semiconductor integrated circuit, each of the first circuit and the second circuit having a normal mode and a standby mode, power generated by the power supplying means being supplied to the semiconductor integrated circuit, the power supplying method comprising the steps of:

supplying the power generated by the power supplying means to the first circuit and the second circuit when an operation mode of the semiconductor integrated circuit is the normal mode; and supplying the power generated by the power supplying means to only the first circuit rather than the second circuit when the operation mode of the semiconductor integrated circuit is the standby mode.

In a standby state, the power of a main circuit that occupies a large area of an integrated circuit is turned off. Thus, a sub threshold leak current can be reduced in the standby state. As a result, in the standby state, a power consumption can be reduced. In addition, it is not necessary to cause a digital circuit that controls on/off of the power supply to be built in a power controlling circuit structured as an analog integrated circuit. Thus, it is not necessary to newly design a power controlling circuit. In addition, when the integrated circuit wakes up from the standby state, a standby controlling circuit stores information of the wakeup cause. Thereafter, when the power supply of the main circuit is turned on, a CPU can identify the wakeup cause and takes a countermeasure against the identified wakeup cause.

These and other objects, features and advantages of the present invention will become more apparent in light of the following detailed description of a best mode embodiment thereof, as illustrated in the accompanying drawings.

DETAILED DESCRIPTION OF THE PREFERRED EMBODIMENTS

Figure 1:
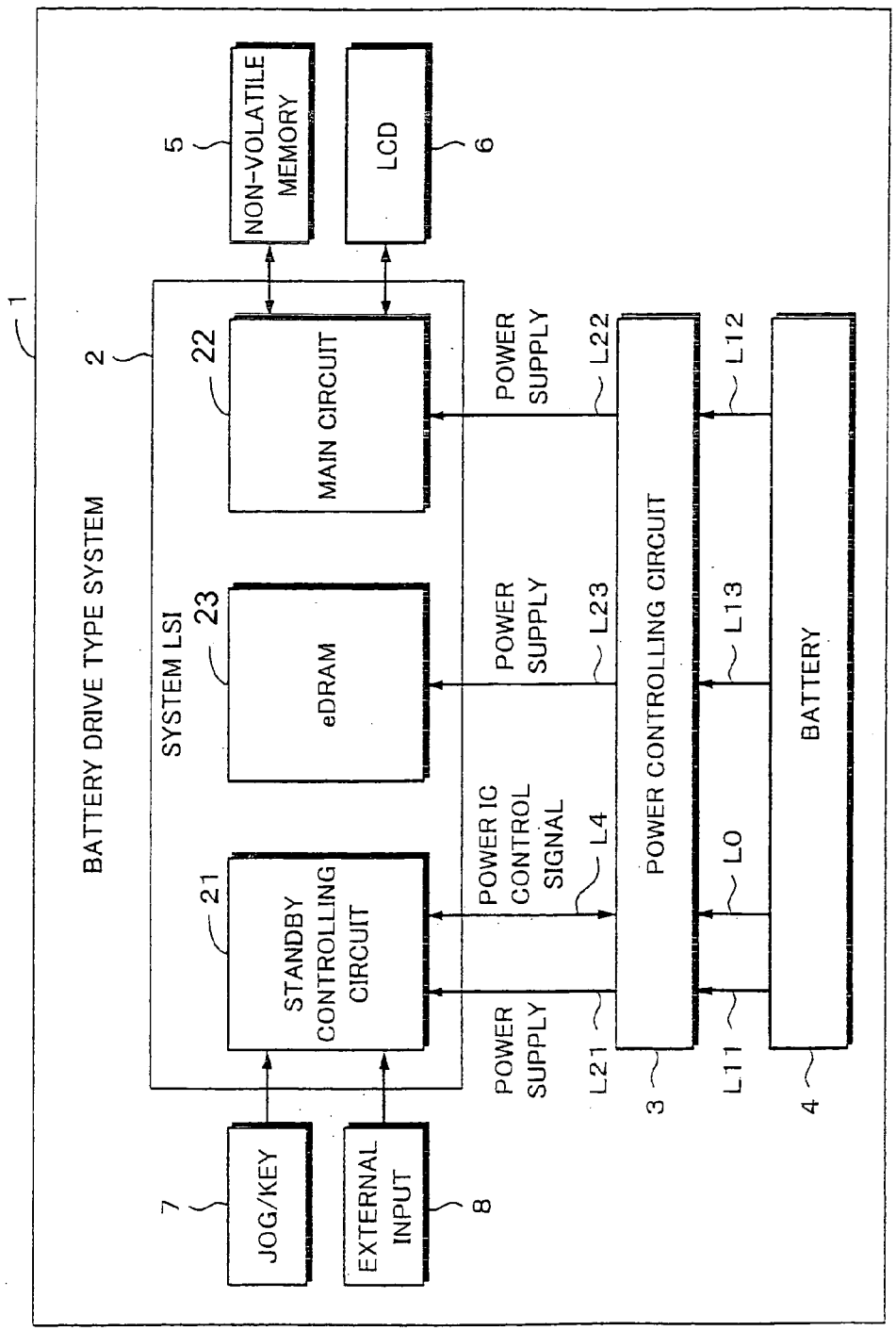
FIG. 1 is a block diagram showing the overall structure of a battery drive type system according to an embodiment of the present invention.

Next, with reference to the accompanying drawings, an embodiment of the present invention will be described. FIG. 1 shows the overall structure of the embodiment. Reference numeral 1 represents a whole battery drive type system such as a PDA or a cellular phone. Reference numeral 2 represents a system LSI (for example, a MOS LSI) that controls the system 1. Reference numeral 3 represents a power controlling circuit that has a regulator that supplies power to the system LSI 2. Reference numeral 4 represents a battery.

The system LSI 2 has a standby controlling circuit 21, a main circuit 22, and an eDRAM (embedded Dynamic Random Access Memory) 23. The individual circuit blocks of the system LSI 2 receive power from the power controlling circuit 3 through three independent power lines L21, L22, and L23.

A power line L11 that extends from the battery 4 to the power controlling circuit 3. The power line L11 is a power supply line for the standby controlling circuit 21. A regulator is connected in the power controlling circuit 3 between the line L11 and the line L21. A power line L12 is a power supply line for the main circuit 22. A regulator is connected to the power controlling circuit 3 between the line L12 and the line 22. A power line L13 is a power supply line for the eDRAM 23. A regulator is connected in the power controlling circuit 3 between the line L13 and the line L23. A power supply line L0 that extends from the battery 4 is a power supply line for a control circuit disposed in the power controlling circuit 3. The individual regulators disposed in the power controlling circuit 3 regulate the output voltage of the battery 4 to predetermined levels suitable for the individual circuits and outputs the regulated voltages to the individual circuits.

The standby controlling circuit 21 is a block to which power is always supplied from the power controlling circuit 3. The main circuit 22 is a block that turns off power when the system LSI 2 is in the standby state. Only when the eDRAM 23 is used to backup data, power is supplied to the eDRAM 23. For example, before the system LSI 2 enters the standby state, program data can be backed up to the eDRAM 23. When power of the eDRAM 23 is turned off in the standby state, power is supplied from the power controlling circuit 3 only to the standby controlling circuit 21 of the system LSI 2.

The supply of power to each circuit block of the system LSI 2 is controlled with a control signal generated by a regulator controlling circuit disposed in the power controlling circuit 3. Corresponding to the control signal, power generated on the power line L22 and the power line L23 are turned on/off. In addition, a power IC control signal is supplied from the standby controlling circuit 21 to the power controlling circuit 3 through a line L4.

In FIG. 1, reference numeral 5 represents a non-volatile memory that is built in the system 1. The non-volatile memory 5 stores a program. Reference numeral 6 represents an LCD (Liquid Crystal Display) as a display portion. Reference numeral 7 represents an operating portion such as keys that the user operates. Reference numeral 8 represents an external input. The external input 8 contains a plurality of I/O ports. The main circuit 22 contains a CPU (Central Processing Unit).

When there is no task that the CPU has to process according to the program, the battery drive type system 1 enters the standby state from the normal operation state. When an operation input takes place on the operating portion 7 or an input takes place on the external input 8, the standby controlling circuit 21 performs a process necessary for a wakeup. The standby controlling circuit 21 supplies to the power controlling circuit 3 through the line L4 a power IC control signal that causes the power controlling circuit 3 to supply power to the main circuit 22 and the data backup eDRAM 23. When power is supplied to the main circuit 22 through the line L22, the main circuit 22 reads a program from the non-volatile memory 5 and initializes the system LSI 2.

Figure 2:
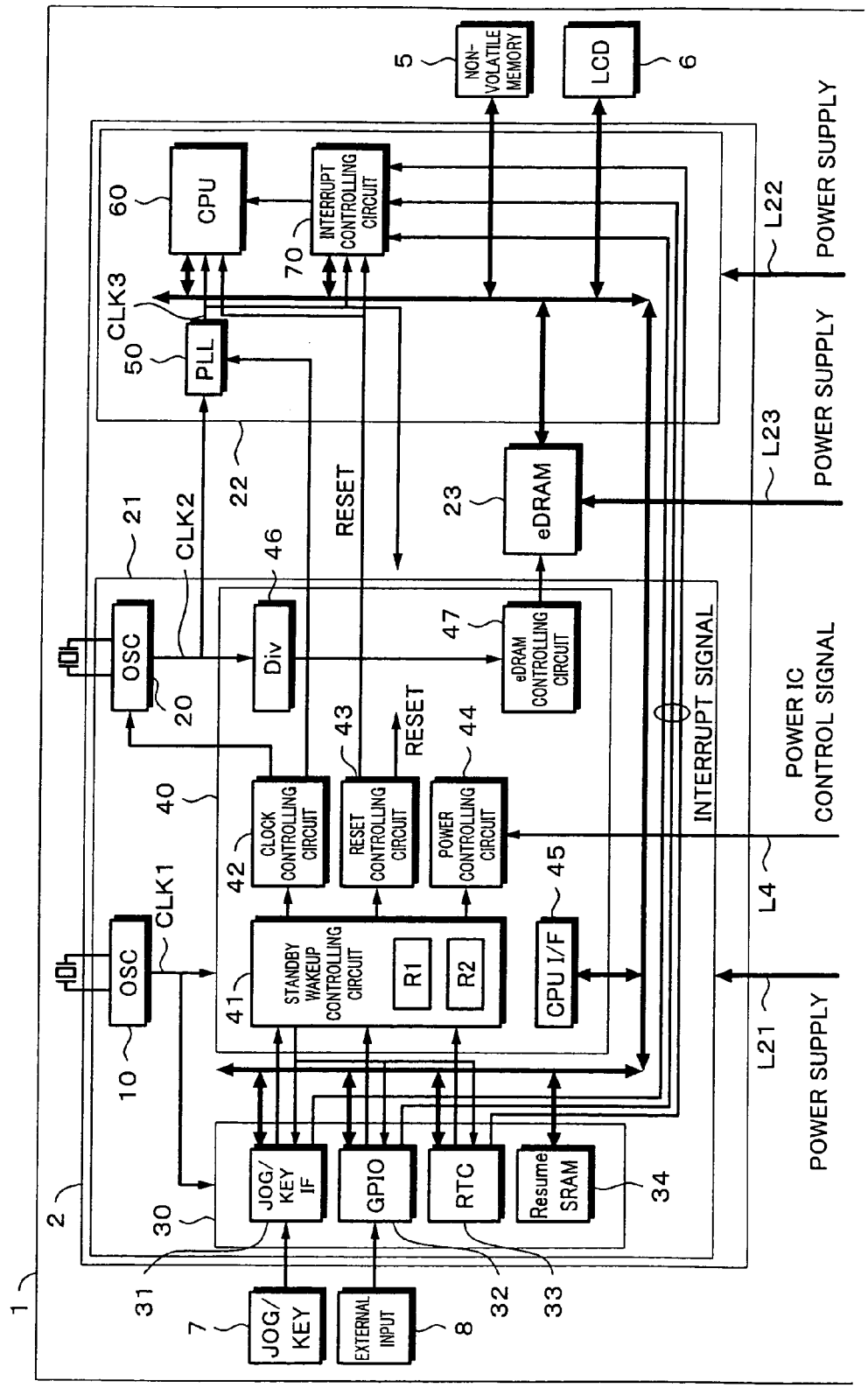
FIG. 2 is a block diagram showing the structure of the embodiment of the present invention.
Figure 3:
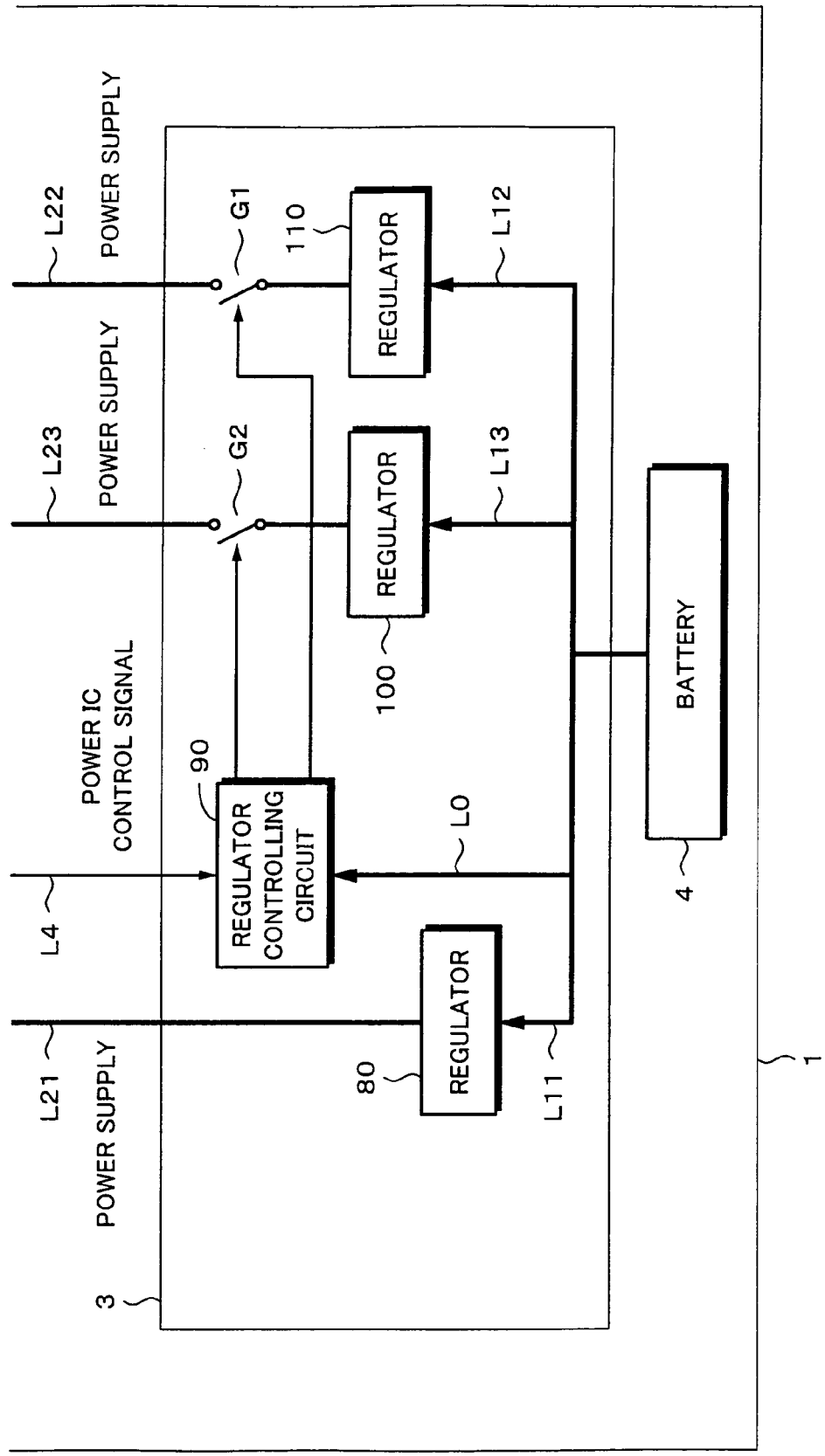
FIG. 3 is a block diagram showing the structure of the embodiment of the present invention.

FIG. 2 and FIG. 3 show the structure of the embodiment in more detail than that shown in FIG. 1. FIG. 2 and FIG. 3 show the while battery drive type system 1. To reduce the drawing space, one drawing of the battery drive type system 1 is divided into two portions shown in FIG. 2 and FIG. 3. FIG. 2 mainly shows the structure of the system LSI 2. FIG. 3 mainly shows the structure of the power controlling circuit 3. In reality, although the circuit scale of the main circuit 22 is much larger than that of the standby controlling circuit 21, FIG. 2 shows only a structural portion of the main circuit 22 according to the feature of the present invention.

The standby controlling circuit 21 has clock oscillators 10 and 20. The clock oscillator 10 generates for example a 32 kHz clock CLK1. On the other hand, the clock oscillator 20 generates for example a 7.68 MHz clock CLK2. The clock oscillator 10 always oscillates in any state of the standby state and the normal operation state. The clock oscillator 10 supplies the clock CLK1 to a peripheral circuit 30 and a system LSI controlling circuit 40 of the standby controlling circuit 21.

When there is no need to back up data to the eDRAM 23 and the system LSI 2 is in the standby state, the clock oscillator 20 stops oscillating. The clock CLK2 is generated by the clock oscillator 20 is supplied to an eDRAM controlling circuit 47 through a frequency dividing circuit 46 of the system LSI controlling circuit 40. In addition, the clock CLK2 is supplied to a PLL (Phase Locked Loop) 50 of the main circuit 22. The PLL 50 generates a system clock CLK3 of which the frequency of the clock CLK2 is raised. The system clock CLK3 is supplied to each circuit block of the main circuit 22. In addition, the system clock CLK3 is supplied to the standby controlling circuit 21.

The standby controlling circuit 21 is largely divided into two portions, which are the peripheral circuit 30 and the system LSI controlling circuit 40. A JOG/KEY interface 31 of the peripheral circuit 30 is an interface that processes an input signal received from the operating portion 7. A GPIO (General Purpose Input Output) 32 is an interface that processes input data received from the external input 8. Reference numeral 33 represents a real time clock circuit. The real time clock circuit 33 is used for counting time. Reference numeral 34 represents a data backup SRAM (Static Random Access Memory).

The system LSI controlling circuit 40 is composed of a standby-wakeup controlling circuit 41 that is a state controlling circuit, a clock controlling circuit 42, a reset controlling circuit 43, a power controlling circuit 44, a CPU bus interface 45, a clock frequency dividing circuit 46, and an eDRAM controlling circuit 47. The standby-wakeup controlling circuit 41, the clock controlling circuit 42, the reset controlling circuit 43, and the power controlling circuit 44 operate with the clock CLK1 supplied from the clock oscillator 10. The eDRAM controlling circuit 47 operates with a clock of which the clock CLK2 is divided by the clock frequency dividing circuit 46. The CPU bus interface 45 operates with the system clock CLK3 supplied from the PLL 50. The standby-wakeup controlling circuit 41 controls the clock controlling circuit 42, the reset controlling circuit 43, and the power controlling circuit 44 so as to manage the states of the system 1 such as the standby state and the normal operation state.

When the standby-wakeup controlling circuit 41 causes the system 1 to enter the standby state, the clock controlling circuit 42 disables the PLL 50. In addition, when data is not backed up to the eDRAM 23 in the standby state, the clock controlling circuit 42 causes the clock oscillator 20 to stop oscillating.

When power is supplied to the main circuit 22, the standby-wakeup controlling circuit 41 causes the reset controlling circuit 43 to reset the main circuit 22. When the battery 4 has run out and it has been substituted with a new battery 4, the reset controlling circuit 43 resets the main circuit 22, the peripheral circuit 30, which is disposed in the standby controlling circuit 21, and the standby-wakeup controlling circuit 41, the power controlling circuit 44, the clock controlling circuit 42, the CPU bus interface 45, and the eDRAM controlling circuit 47, which are disposed in the system LSI controlling circuit 40.

The power controlling circuit 44 outputs the power IC control signal to the line L4 under the control of the standby-wakeup controlling circuit 41. As shown in FIG. 3, the power controlling circuit 3 is provided with a regulator controlling circuit 90. The power IC control signal is supplied to the regulator controlling circuit 90 through the line L4.

The CPU bus interface 45 is connected to a CPU 60 disposed in the main circuit 22 through a CPU bus denoted by a thick line. The CPU 60 reads and writes data from and to a register disposed in the standby-wakeup controlling circuit 41 through the CPU bus interface 45 so as to control the standby-wakeup controlling circuit 41, the clock controlling circuit 42, the reset controlling circuit 43, and the eDRAM controlling circuit 47. The eDRAM controlling circuit 47 controls refreshing of the eDRAM 23.

The standby-wakeup controlling circuit 41 is provided with, for example, a power off register R1 and a wakeup status register R2 to and from which the CPU 60 can read and write data. The registers R1 and R2 have a predetermined bit length and store data while the system 1 is in the standby state. The power off register R1 is a register that issues a power OFF command to the standby-wakeup controlling circuit 41 so as to set the system 1 for the standby state. The wakeup status register R2 is a register that stores information that represents by what cause a wakeup has taken place. In other words, the wakeup status register R2 is a register that represents which of the circuits 31 to 33 of the peripheral circuit 30 has issued a wakeup request. Whether or not the individual circuits have issued a wakeup request are represented by values ("0" or "1") of a plurality of bits of the register R2.

The main circuit 22 comprises the PLL 50, the CPU 60, and an interrupt controlling circuit 70. As described above, the main circuit 22 contains many other circuits such as a controlling circuit for the LCD 6. However, since they do not relate to the present invention, their illustration and description will be omitted. The PLL 50 multiplies the frequency of the system clock CLK3 supplied from the clock oscillator 20 by a predetermined value so as to generate the system clock CLK3 necessary for operating the system LSI 2. The system clock CLK3 is a clock for the CPU bus. The system clock CLK3 is also supplied to the standby controlling circuit 21. In addition, when power of the main circuit 22 is turned on, after the oscillation of the oscillator 20 becomes stable, the system clock CLK3 causes the PLL 50 to be enabled under the control of the clock controlling circuit 42.

The CPU 60 executes a program stored in the non-volatile memory 5 so as to display data on the LCD 6 and process input data received from the operating portion 7 and input data received from the external input 8. The CPU 60 receives an interrupt from the interrupt controlling circuit 70 and performs an interrupt process. The CPU 60 is connected to the CPU bus. The non-volatile memory 5, the LCD 6, the eDRAM 23, the CPU bus interface 45, and the interrupt controlling circuit 70 are connected to the CPU bus.

In addition, the JOG/KEY interface 31, the GPIO 32, the real time clock circuit 33, and the SRAM 34 are connected to the CPU bus. Each of these circuits contained in the peripheral circuit 30 is composed of a bus interface circuit and an internal operating portion. The bus interface circuit operates with the system clock CLK3 of which the frequency of the clock CLK2 is raised by the PLL 50. By reading and writing data from and to a register of each circuit through the bus interface circuit of each circuit, the CPU 60 can control the circuits 31 to 34. In addition, the circuits 31 to 33 supply an interrupt signal to the interrupt controlling circuit 70 of the main circuit 22 so as to notify the interrupt controlling circuit 70 of an interrupt.

In addition, while the system clock CLK3 stops, the standby controlling circuit 21 is capable of operating. While the system 1 is in the standby state, when a wakeup cause takes place in one of the interface 31, the GPIO 32, and the real time clock circuit 33, the standby controlling circuit 21 sends a wakeup request to the standby-wakeup controlling circuit 41.

The standby-wakeup controlling circuit 41 causes the power controlling circuit 44 to supply the power IC control signal to the power controlling circuit 3 so as to supply power to the main circuit 22. Thereafter, the standby-wakeup controlling circuit 41 causes the clock oscillator 20 to oscillate so as to enable the PLL 50. When the system clock CLK3 becomes stable, the standby-wakeup controlling circuit 41 sends an interrupt signal that represents the wakeup cause to the interrupt controlling circuit 70. The interrupt controlling circuit 70 is provided with a status register that represents whether or not an interrupt has taken place.

Next, with reference to FIG. 3, the power controlling circuit 3 will be described. An output voltage of the battery 4 is supplied to a regulator 80, the regulator controlling circuit 90, a regulator 100, and a regulator 110. While the system 1 is in the standby state and the normal operation state, the regulator 80 supplies power to the standby controlling circuit 21 through the line L21.

The regulator 110 supplies an output voltage of the battery 4 to the main circuit 22 through a gate G1 and the line L22. The regulator 100 supplies an output voltage of the battery 4 to the eDRAM 23 through a gate G2 and the line L23. The power IC control signal received from the power controlling circuit 44 is supplied to the regulator controlling circuit 90. The regulator controlling circuit 90 generates a control signal with which gates G1 and G2 are controlled. Thus, power to the main circuit 22 and the eDRAM 23 are turned on and off corresponding to the power IC control signal.

Figure 4:
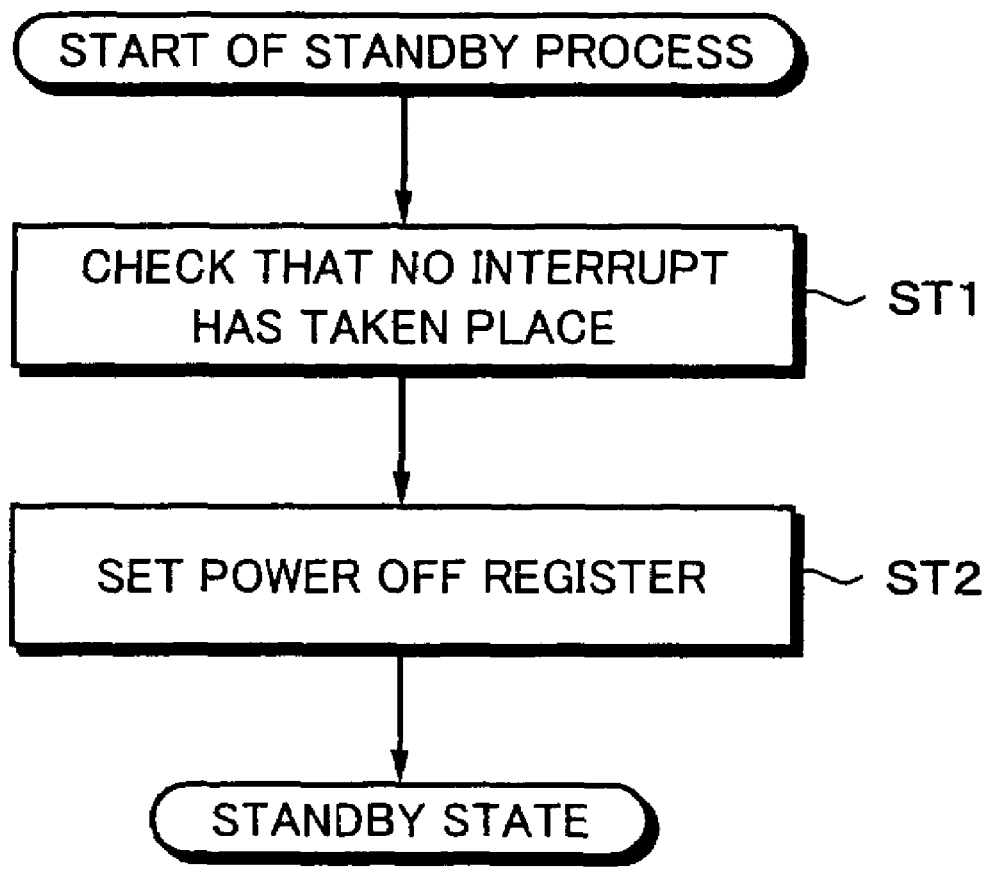
FIG. 4 is a flow chart showing a process performed when the system enters a standby state according to the embodiment of the present invention.

Next, a control operation performed by the CPU 60 according to the present embodiment of the present invention will be described. First of all, with reference to a flow chart shown in FIG. 4, an operation that causes the system LSI 2 to enter the standby state from the operation state will be described.

At step ST1, the CPU 60 reads the contents of the register of the interrupt controlling circuit 70 so as to determine that no interrupt has taken place. When there is no task that the CPU 60 has to process and the determined result at step ST1 represents that no interrupt has taken place, the flow advances to step ST2. At step ST2, the CPU 60 sets the power off register R1 of the standby-wakeup controlling circuit 41. As a result, the CPU 60 issues a power OFF command to the standby-wakeup controlling circuit 41 so as to cause the system LSI 2 to enter the standby state.

The power OFF command is supplied to the standby-wakeup controlling circuit 41 through the CPU bus interface 45. The standby-wakeup controlling circuit 41 controls the clock controlling circuit 42 and the power controlling circuit 44 so as to cause the system LSI 2 to enter the standby state. In other words, the clock controlling circuit 42 disables the PLL 50. When data is not backed up to the eDRAM 23, the clock controlling circuit 42 stops the clock oscillator 20. The power controlling circuit 44 outputs the power IC control signal to the line L4. The regulator controlling circuit 90 of the power controlling circuit 3 receives the power IC control signal and turns off the gate G1 so as to turn off power to the main circuit 22. When data is not backed up to the eDRAM 23, the regulator controlling circuit 90 turns off the gate G2 so as to turn off power to the eDRAM 23.

Figure 5:
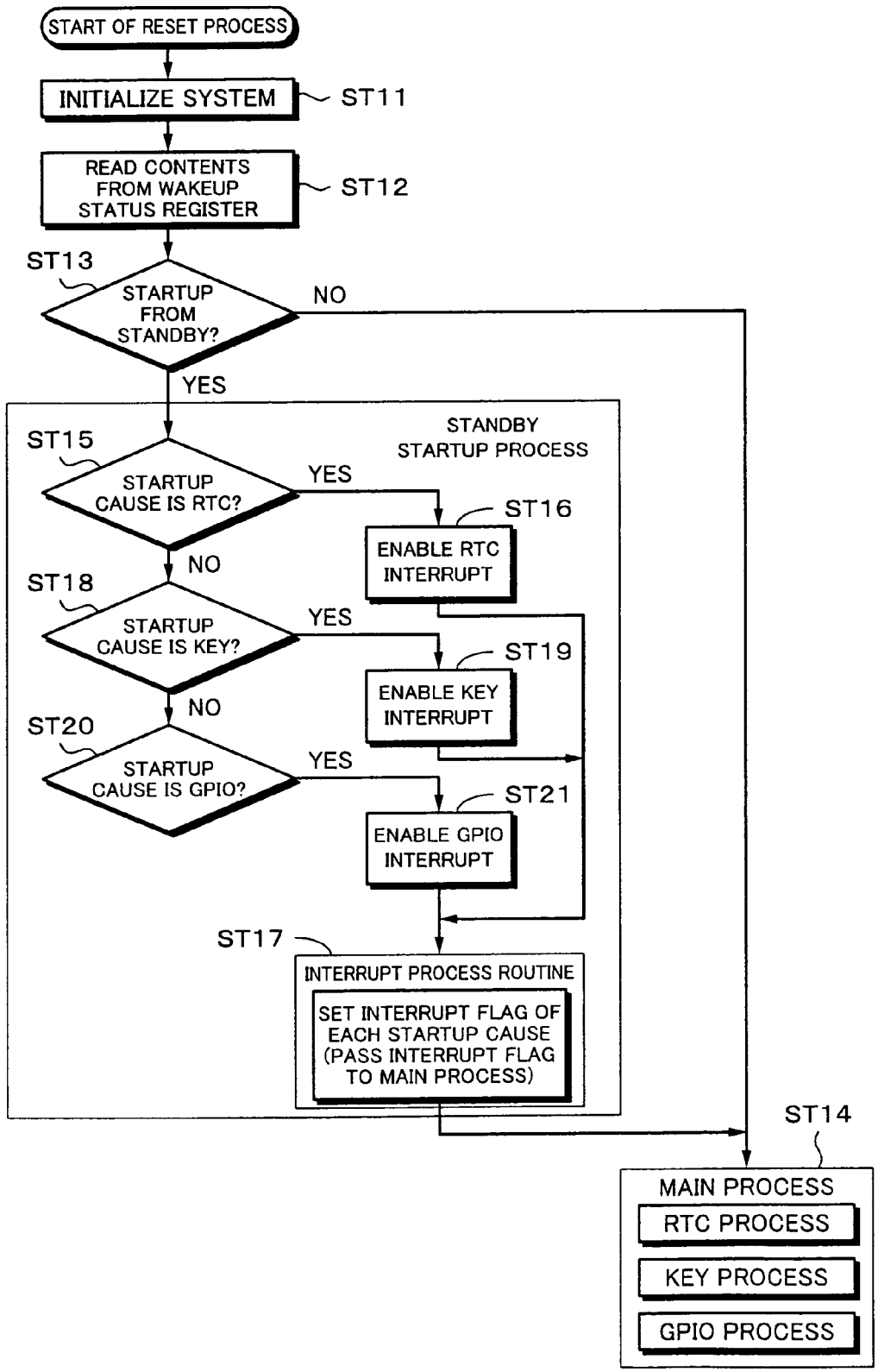
FIG. 5 is a flow chart showing a process performed when the system wakes up from the standby state according to the embodiment of the present invention.

Next, with reference to a flow chart shown in FIG. 5, an operation for processing a block that has waked up from the standby state and that has issued a wakeup request will be described.

When a wakeup cause takes place, a reset process gets started. At step ST1, the system 1 is initialized. In this case, values of the plurality of bits of the wakeup status register R2 represent whether or not a wakeup request has taken place in each of the JOG/KEY interface 31, the GPIO 32, and the real time clock circuit 33 of the peripheral circuit 30. When a wakeup request is supplied to the standby-wakeup controlling circuit 41, the power controlling circuit 44 supplies a power IC control signal to the regulator controlling circuit 90 of the power controlling circuit 3. Corresponding to the power IC control signal, the gates G1 and G2 are controlled so that powers to the main circuit 22 and the eDRAM 23 are turned on.

When power is supplied to the main circuit 22, the reset controlling circuit 43 resets the CPU 60 and the interrupt controlling circuit 70 of the main circuit 22. When the clock oscillator 20 has stopped, the reset controlling circuit 43 starts the clock oscillator 20 and enables the PLL 50. As a result, the PLL 50 starts generating the system clock CLK3. When power and the system clock CLK3 are supplied, the CPU 60 of the main circuit 22 starts operating.

At step ST12, the CPU 60 reads the contents of the wakeup status register R2 of the standby-wakeup controlling circuit 41. At step ST13, the CPU 60 determines whether or not the system 1 has awakened from the standby state according to the contents of the wakeup status register R2. For example, when the battery 4 has run out and it has been substituted with a new battery 4, the determined result at step ST13 is No. Thus, the flow advances to step ST14.

Step ST14 is a main process performed by the battery drive type system 1. The main process includes a KEY process, a GPIO process, and an RTC process. The KEY process is a process for data that is input through the JOG/KEY interface 31. The GPIO process is a process for data that is input through the GPIO 32. The RTC process is a process for data that is input through the real time clock circuit 33.

When the determined result at step ST13 represents that a startup has taken place from the standby state, a standby-startup process is performed. For example, first of all, at step ST11, it is determined whether or not the startup cause is an input from the real time clock circuit 33 according to the contents of the wakeup status register R2. For example, when a time has been set before the system 1 has entered the standby state, at the time that has been set, the real time clock circuit 33 generates a wakeup request.

When the determined result at step ST15 represents that the startup cause is an input from the real time clock circuit 33, the flow advances to step ST16. At step ST16, relevant data is written to the interrupt enable register of the interrupt controlling circuit 70 so as to enable the disabled RTC interrupt signal to the CPU 60. Thereafter, the CPU 60 is notified of an interrupt. As a result, an interrupt process routine is executed on the program (step ST17). In the interrupt process routine, an RTC interrupt flag is set. Thereafter, the flow advances to step ST14. At step ST14, the RTC process in the main process is executed.

When the determining result at step ST15 represents that the startup cause is not an input from the real time clock circuit 33, the flow advances to step ST18. At step ST18, it is determined whether or not the startup cause is an input through the JOG/KEY interface 31 according to the contents of the wakeup status register R2. When an operation of any key or the like has taken place in the operating portion 7, a wakeup operation is performed.

When the determined result at step ST18 represents that the startup cause is an input through the JOG/KEY interface 31, the flow advances to step ST19. At step ST19, relevant data is written to the interrupt enable register of the interrupt controlling circuit 70 so as to enable a disabled KEY interrupt signal to the CPU 60. Thereafter, the CPU 60 is notified of an interrupt. As a result, an interrupt process routine is executed on the program (at step ST17). In the interrupt process routine, a KEY interrupt flag is set and necessary information such as information that identifies an operated key is generated. Thereafter, the flow advances to step ST14. At step ST14, the KEY process in the main process is performed.

When the determined result at step ST18 represents that the startup cause is not an input through the JOG/KEY interface 31, the flow advances to step ST20. At step ST20, it is determined whether or not the startup cause is an input through the GPIO 32 according to the contents of the wakeup status register R2. As the external input 8, there are a plurality of I/Os, for example 32 I/Os. When a USB (Universal Serial Bus) cable is connected to the system 1 or a memory card type PHS (Peripheral Handyphone System) card is attached to the system 1, a wakeup operation is performed with an input through the GPIO 32.

When the determined result at step ST20 represents that the startup cause is an input through the GPIO 32, the flow advances to step ST21. At step ST21, relevant data is written to the interrupt enable register of the interrupt controlling circuit 70 so as to enable a disabled GPIO interrupt signal to the CPU 60. Thereafter, the CPU 60 is notified of an interrupt process. As a result, an interrupt process routine is executed on the program (at step ST17). In the interrupt process routine, a GPIO interrupt flag is set and necessary information such as information that identifies an external input is generated. Thereafter, the flow advances to step ST14. At step ST14, the GPIO process in the main process is performed.

Figure 6:
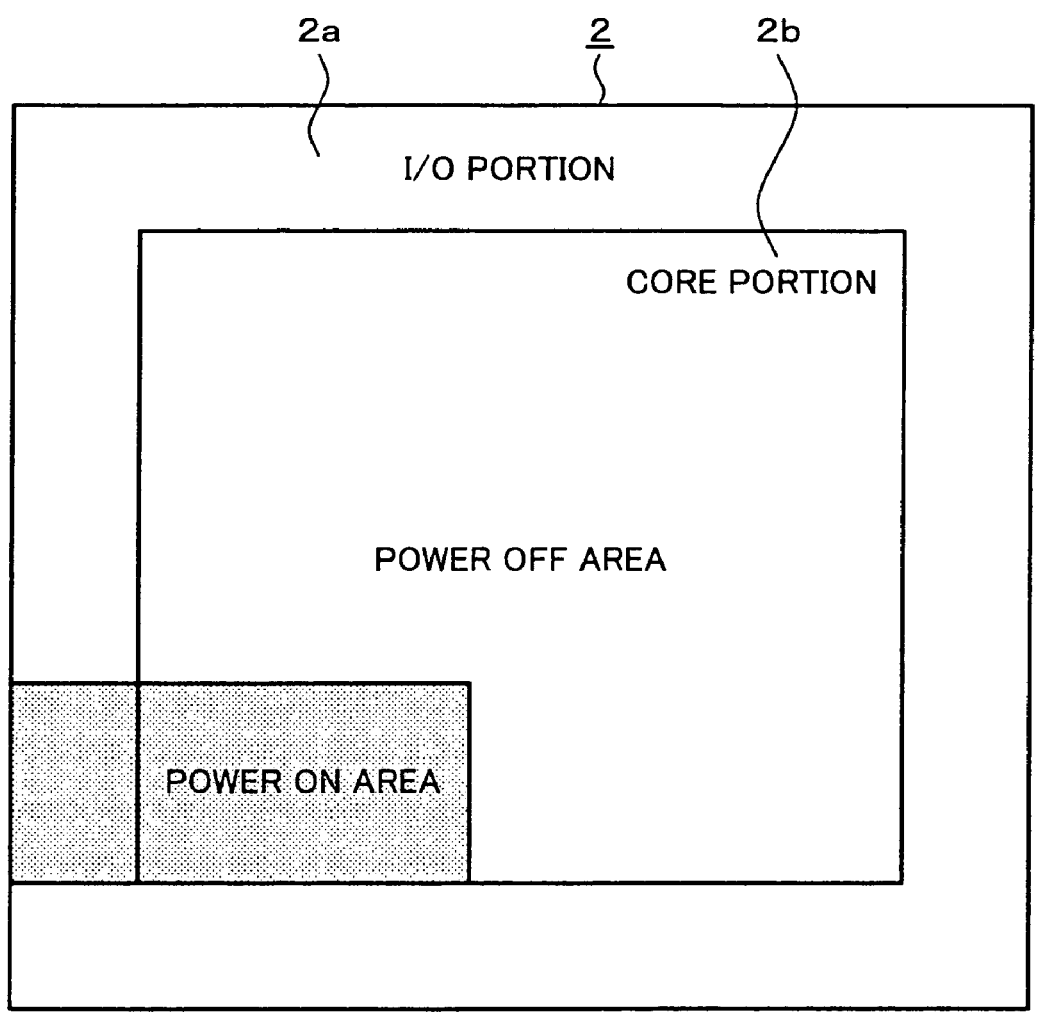
FIG. 6 is a plan view showing a power ON area and a power OFF area of a system LSI.

Next, a problem and a countermeasure in the case that a power ON area and a power OFF area co-exist on the same LSI will be described. FIG. 6 is a plan view showing the physical structure in the case that the foregoing system LSI 2 is generally composed of an I/O portion (a signal interface portion to an external device) 2a and a core portion (an internal memory, an internal logic portion, and so forth) 2b. In the standby state, a power ON area and a power OFF area co-exist on the system LSI 2. As described above, the standby controlling circuit 21 is contained in the power ON area. The main circuit 22 is contained in the power OFF area. Whether the eDRAM 23 is contained in the power ON area or the power OFF area depends on whether or not data is backed up.

In the case that the power ON area and the power OFF area co-exist on the system LSI 2, when drive side power is turned off, an input potential of a signal that is input from the power OFF area to the power ON area becomes unstable. As a result, a DC current flows in a first stage logic circuit portion of the power ON area side.

Figure 7:
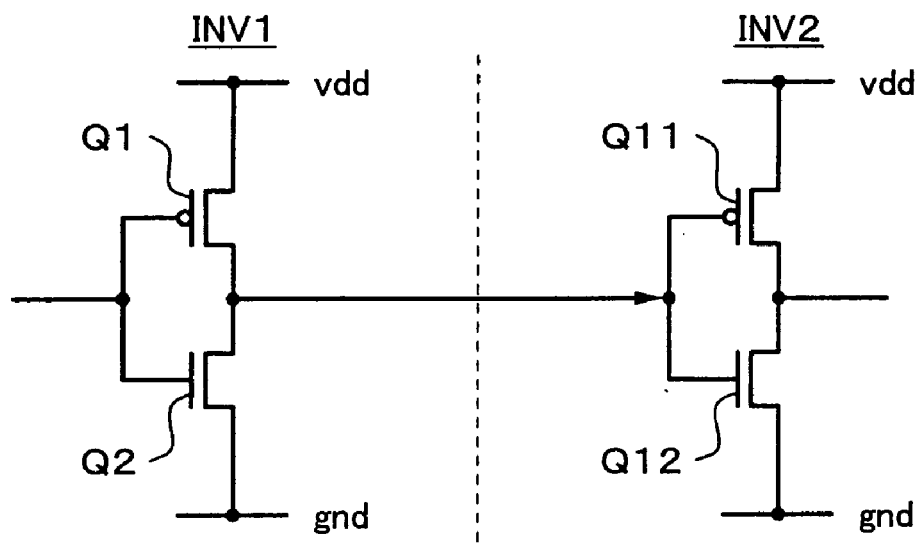
FIG. 7 is a schematic diagram showing connection of the system LSI in the normal operation state for describing a problem that takes place at a boundary portion of the power ON area and the power OFF area of the system LSI.
Figure 8:
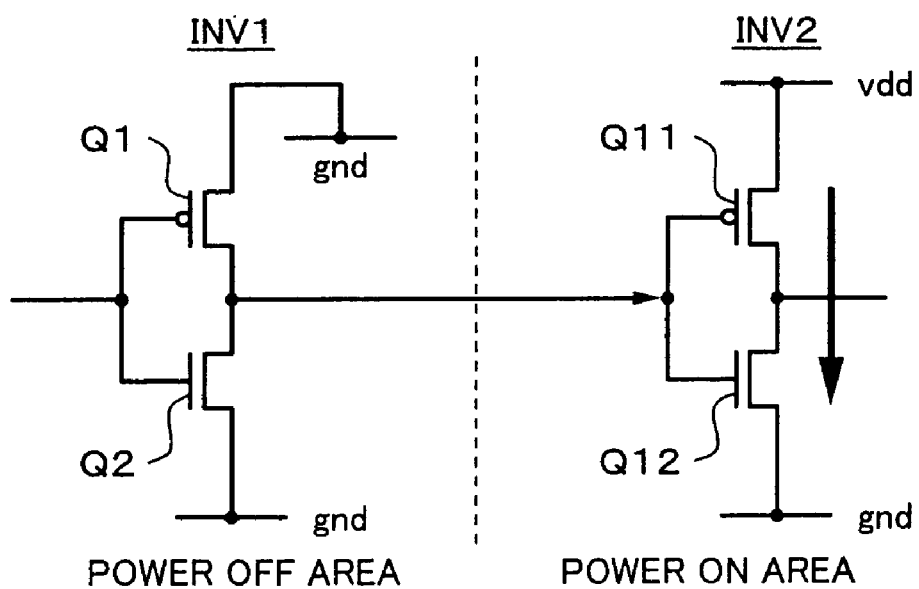
FIG. 8 is a schematic diagram showing connection of the system LSI in the standby state for describing a problem that takes place at a boundary portion of the power ON area and the power OFF area of the system LSI.

FIG. 7 and FIG. 8 show such a situation. In FIG. 7 and FIG. 8, Q1 and Q11 represent p-channel MOS-FETs. Q2 and Q12 represent n-channel MOS-FETs. The sources of Q1 and Q11 are connected to a terminal vdd of a positive side power supply voltage. The sources of Q2 and Q12 are connected to a terminal gnd of a negative side power supply voltage (for example, potential 0). The drains of Q1 and Q2 are connected to each other. The gates of Q1 and Q2 are connected to each other. As a result, a last stage inverter INV1 in the power OFF area is structured. The drains of Q11 and Q12 are connected to each other. The gates of Q11 and Q12 are connected to each other. As a result, an initial stage inverter INV2 in the power ON area is structured. In FIG. 7 and FIG. 8, dotted lines represent a boundary of the power OFF area and the power ON area.

In the normal operation state shown in FIG. 7, the positive side power supply voltage is applied to the power supply terminal vdd. When an input voltage that is equal to the negative side power supply voltage is applied to for example the inverter INV1, the p-channel FET Q1 is turned on, whereas the n-channel FET Q2 is turned off. As a result, an output voltage that is equal to the positive side power supply voltage is generated. The generated voltage is supplied to the inverter INV2. As a result, FET Q11 is turned off, whereas FET Q12 is turned on. As a result, the output voltage becomes equal to the negative side power supply voltage. In such a manner, the MOS-FET inverters INV1 and INV2 normally operate. The output voltage of the inverter INV2 is fixed to a value corresponding to the input voltage (vdd or gnd).

On the other hand, when the system LSI 2 enters the standby state, as shown in FIG. 8, the negative side power supply voltage is applied to the positive side power supply terminal of the inverter INV1 contained in the power OFF area. In other words, the source side potential of the p-channel MOS-FET Q1 is short-circuited to gnd. Thus, the potential of the output terminal (the connection point of the drains of Q1 and Q2) of the inverter INV1 becomes an unstable state that cannot be driven by the driver. In this state, both MOS-FET Q11 and Q12 of the initial stage inverter INV2 in the power ON area become the ON state. As a result, a through-current (DC current) that is peculiar to CMOS flows in MOS-FET Q11 and Q12. Thus, the power consumption will increase and the devices will be damaged.

Figure 9:
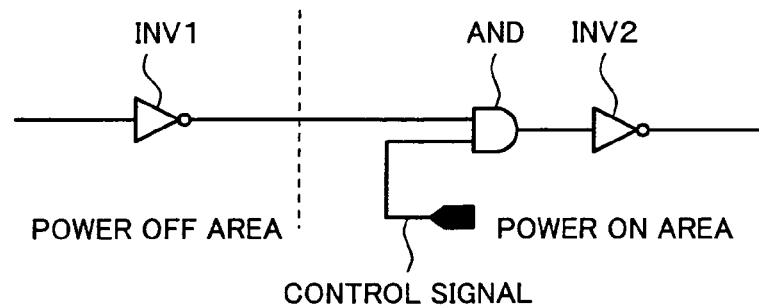
FIG. 9 is a block diagram showing the structure that prevents the problem that takes place at the boundary of the power ON area and the power OFF area of the system LSI.

Next, with reference to FIG. 9 and FIG. 10, the structure of the embodiment that prevents such a problem from taking place will be described. As shown in FIG. 9, a two-input AND gate AND is disposed between an inverter INV1 and an inverter INV2 in a power ON area. An output of the inverter INV1 is supplied to one input terminal of the AND gate AND. A control signal is supplied to the other input terminal. In a normal operation state, the control signal is "1" (that represents logic "1"). In a standby state, the control signal is "0" (that represents logic "0"). The control signal is supplied from a control signal generating portion (not shown in FIG. 2) disposed in the system LSI controlling circuit 40. Thus, in the normal operation state, an output of the inverter INV1 is input as it is to an input terminal of the inverter INV2 by the AND gate AND according to a control signal. In the standby state, an output of the AND gate AND is fixed to "0" according to the control signal.

Figure 10:
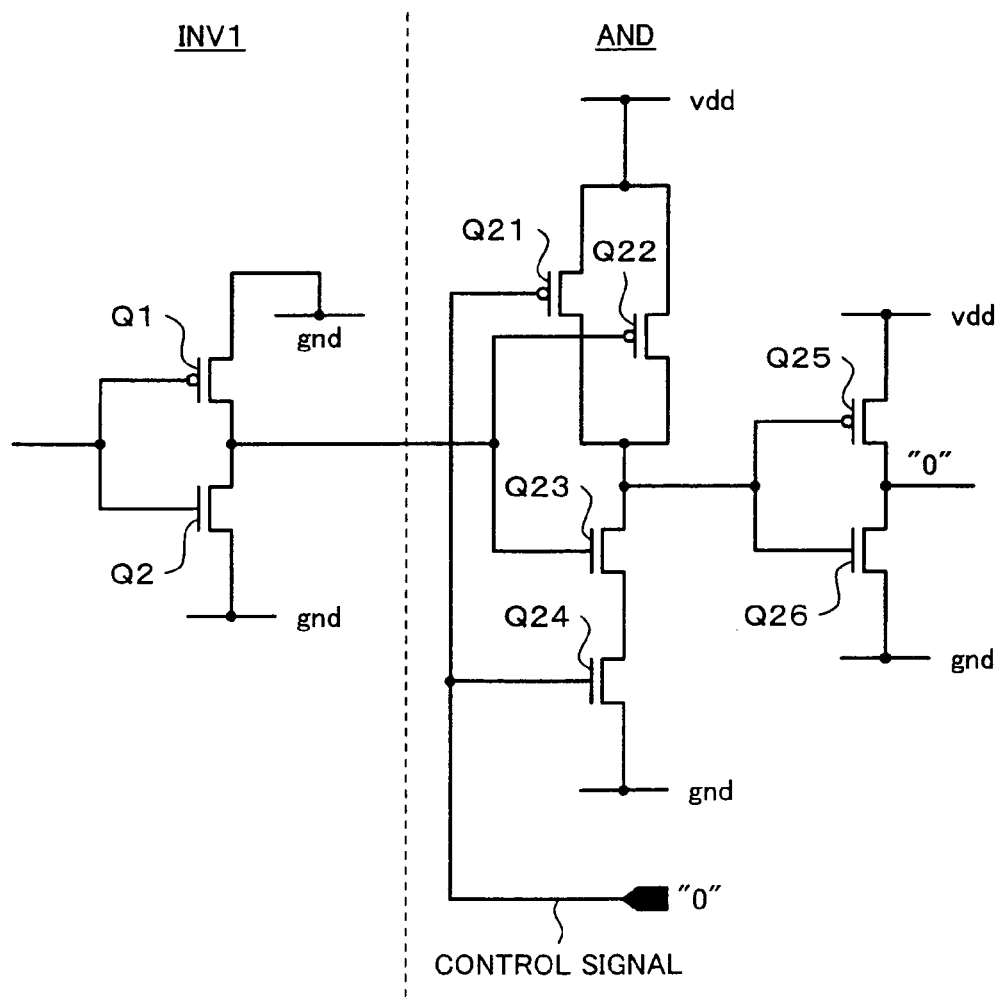
FIG. 10 is a schematic diagram showing connections of the system LSI for preventing the problem from taking place at the boundary of the power ON area and the power OFF area of the system LSI.

FIG. 10 shows the connections of the MOS-FET according to FIG. 9. The AND gate AND is composed of p-channel MOS-FET Q21 and Q22, n-channel MOS-FET Q23 and Q24, and MOS-FET Q25 and Q26 that are inverters. The sources of Q21, Q22, and Q25 are connected to a power supply terminal vdd. The drains of Q21 and Q22 are connected in common with the drain of Q23. The source of Q23 is connected to the drain of Q24. The source of Q24 is connected to a power supply terminal gnd. A control signal is supplied as a first input to the gates of Q21 and Q24. An output of the inverter INV1 is supplied as a second inputs to the gates of Q23 and Q24. In FIG. 10, the inverter INV2 is not shown. Alternatively, the last stage inverter of the AND gate AND may be used in common with the inverter INV2.

In the normal operation state, since the control signal is "1", when the output of the inverter INV1 is "0", Q21 is turned off, Q22 is turned on, Q23 is turned off, Q24 is turned on, Q25 is turned off, and Q26 is turned on. As a result, the output of the AND gate AND becomes "0". When the output of the inverter INV1 is "1", Q21 is turned off, Q22 is turned off, Q23 is turned on, Q24 is turned on, Q25 is turned on, and Q26 is turned off. As a result, the output of the AND gate AND becomes "1". Thus, the output of the AND gate AND is the same value as the input thereof.

In the standby state, since the control signal is fixed to "0", the MOS-FET Q21 is always turned on. As a result, an output supplied to the common connection point of the gates of MOS-FET Q25 and Q26 is fixed to "1". Thus, MOS-FET Q26 is always turned on and the output of the AND gate AND is fixed to "0". Consequently, a DC current can be prevented from flowing in the initial stage inverter of the power ON area. In the standby state, a through-current (DC current) can be prevented from flowing. In the standby state, the power consumption can be reduced.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention. For example, according to the present invention, a battery is used as a power supply. Alternatively, a power supply of which a commercial power supply is rectified can be used along with a battery.

According to the present invention, in the standby state, power to the main circuit that mostly occupies the LSI is turned off. Thus, a sub threshold leak current can be prevented from flowing. As a result, the power consumption in the standby state can be remarkably reduced. In addition, according to the present invention, with a simple structure, a DC current can be prevented from flowing when power is turned off and a potential becomes unstable. Thus, in the standby state, the power consumption can be securely reduced.

According to the present invention, it is not necessary to cause a digital circuit that controls on/off of power to be built in a power controlling circuit as an analog integrated circuit. Thus, it is not necessary to newly design an IC for a power controlling circuit. In addition, according to the present invention, when the system LSI 2 wakes up from the standby state, the standby controlling circuit stores information of the wakeup cause. Thus, thereafter, when power of the main circuit is turned on, the CPU can immediately identify the wakeup cause and perform a process according to the identified wakeup cause.

What is claimed is:

1. An electronic apparatus having a semiconductor integrated circuit and power supplying means, the apparatus comprising:
    a main circuit, disposed in the semiconductor integrated circuit, the main circuit having at least a CPU, power being supplied to the main circuit through the power supplying means;
    a standby controlling circuit disposed in the semiconductor integrated circuit, power being supplied to the standby controlling circuit through the power supplying means when the standby control circuit is in an operation mode and a standby mode;
    wherein when the standby controlling circuit receives a standby command from the CPU, the standby controlling circuit turns off a switch, within the power supplying means, that provides power to the main circuit;
    wherein when a wakeup cause takes place, the standby controlling circuit holds information about the wakeup cause in the standby mode and turns on the power supplied to the main circuit by the power supplying means; and
    wherein the CPU of the main circuit identifies the wakeup cause, by accessing the information held in the standby controlling circuit, and executes a process corresponding to the identified wakeup cause.

2. A power supplying method for an electronic apparatus having a power supplying means and a semiconductor integrated circuit composed of a main circuit and a standby controlling circuit, wherein the power of the standby controlling circuit provided by the power supplying means is always turned on, the main circuit having a CPU, the method comprising the steps of:
    when the CPU of the main circuit in the semiconductor integrated circuit issues a standby command, cause the standby controlling circuit in the semiconductor integrated circuit to turn off power provided to the main circuit by the power supplying means, wherein the power provided to the standby controlling circuit by the power supplying means is maintained;
    when a wakeup cause takes place, causing the standby controlling circuit to hold information about the wakeup cause and turn on power provided to the main circuit by the power supplying means; and
    causing the CPU of the main circuit to identify the wakeup cause, by accessing the information held in the standby controlling circuit, and execute a process corresponding to the identified wakeup cause.

* * * * *